United States Patent
Pegorier et al.

(10) Patent No.: US 10,723,285 B2
(45) Date of Patent: Jul. 28, 2020

(54) TRIM ELEMENT COMPRISING A DEFORMABLE OUTER SURFACE AND ASSOCIATED VEHICLE

(71) Applicant: Faurecia Interieur Industrie, Nanterre (FR)

(72) Inventors: Nicolas Pegorier, Parmain (FR); Fernandez Rayar, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 57 days.

(21) Appl. No.: 16/128,174

(22) Filed: Sep. 11, 2018

(65) Prior Publication Data

US 2019/0077335 A1    Mar. 14, 2019

(30) Foreign Application Priority Data

Sep. 11, 2017 (FR) .................................... 17 58382

(51) Int. Cl.
*B60R 13/02* (2006.01)
*B60N 2/75* (2018.01)

(52) U.S. Cl.
CPC ............ *B60R 13/0256* (2013.01); *B60N 2/75* (2018.02); *B60N 2/763* (2018.02); *B60N 2/77* (2018.02)

(58) Field of Classification Search
CPC ...... B60R 13/0256; B60N 2/75; B60N 2/763; B60N 2/77
See application file for complete search history.

(56) References Cited

U.S. PATENT DOCUMENTS

| 10,377,104 | B2 * | 8/2019 | Kaneko | ................ D06N 3/0013 |
| 2013/0200646 | A1 * | 8/2013 | Teichmann | ......... B29C 44/1266 296/70 |

FOREIGN PATENT DOCUMENTS

| DE | 102009060471 A1 | 6/2011 | |
| FR | 2824510 A1 * | 11/2002 | ............... B60Q 3/14 |
| FR | 2894530 A1 | 6/2007 | |

OTHER PUBLICATIONS

French Search Report for application No. FR 1758382, dated Mar. 8, 2018, 2 pages.

* cited by examiner

*Primary Examiner* — Lori L Lyjak
(74) *Attorney, Agent, or Firm* — Reising Ethington P.C.

(57) ABSTRACT

A dashboard of a vehicle has a structure that includes at least one first element and at least one second element, and a skin covering at least part of the first element and the second element. The structure and the skin together define an outer surface of the dashboard. The first element and the second element are able to be moved relative to one another, with the movement causing a deformation of the outer surface of the dashboard.

9 Claims, 4 Drawing Sheets

TRIM ELEMENT COMPRISING A DEFORMABLE OUTER SURFACE AND ASSOCIATED VEHICLE

FIELD OF THE INVENTION

The present invention relates to a trim element, and more particularly, to a dashboard of a vehicle having a deformable outer surface.

BACKGROUND

Trim elements with a deformable outer surface are known. Such trim elements for example make it possible to modify the position of a support surface, such as an armrest, protruding from the outer surface, or to modify the appearance of the outer surface based on specific uses of the vehicle.

Such a modification of the shape of the outer surface may be obtained by arranging inflatable elements below the outer surface and commanding the inflation of these elements to create a raised zone across from an inflated element.

Such a pneumatic system is, however, not satisfactory for several reasons.

It is, in fact, difficult to obtain the desired rigidity of the outer surface across from an inflated element, which makes the system relatively unsuitable for forming a support surface. Furthermore, the feel of the outer surface is not satisfactory, since it is not uniform over the entire outer surface, the latter being rigid in the non-inflated zones and less rigid across from an inflated element.

SUMMARY

One of the aims of the invention is to offset these drawbacks by proposing a trim element whereof the outer surface can be modified based on the desired shape and without modifying its rigidity.

To that end, the invention relates to a dashboard of the aforementioned type, comprising:
a structure comprising at least one first element and at least one second element, and
a skin covering at least part of the first element and of the second element,
the structure and the skin together defining an outer surface of the dashboard,
the first element and the second element being able to be moved relative to one another, said movement causing a deformation of the outer surface of the dashboard.

The use of elements that are movable relative to one another to modify an outer surface of the trim element makes it possible to have a rigidity that is identical or at least similar for the entire outer surface.

Various embodiments of the trim element according to the invention may have any one or more of the following features, considered alone or according to any technically possible combination:
the dashboard comprises a control system suitable for driving the movement of the first element and the second element relative to one another.
the first element and the second element are able to be moved between a first configuration and a second configuration, the shape of the outer surface of the dashboard being deformed from a first shape in the first configuration to a second shape in the second configuration, the dashboard comprises two second elements, the two second elements being adjacent to one another in the first configuration and being separated from one another in the second configuration,
the dashboard comprises a single first element forming the body of the dashboard and extending over the entire dashboard and at least one second element moving in contact with the body,
the body comprises a series of strips adjacent to one another in the first direction, each strip being deformable relative to the rest of the body in a second direction substantially perpendicular to the first direction, the second element being suitable for deforming said strips,
the first element and the second element are able to be moved relative to one another in the first direction.

The invention further relates to a vehicle comprising a dashboard of the aforementioned type.

According to another embodiment of the vehicle according to the invention, the vehicle comprises a second trim element, the second trim element having a deformable outer surface, such that the outer surface of the second trim element deforms in a manner coordinated with the deformation of the outer surface of the dashboard.

BRIEF DESCRIPTION OF THE DRAWINGS

Other aspects and advantages of the invention will appear upon reading the following description, provided as an example, and done in reference to the appended drawings, in which.

DETAILED DESCRIPTION

Figure 1:
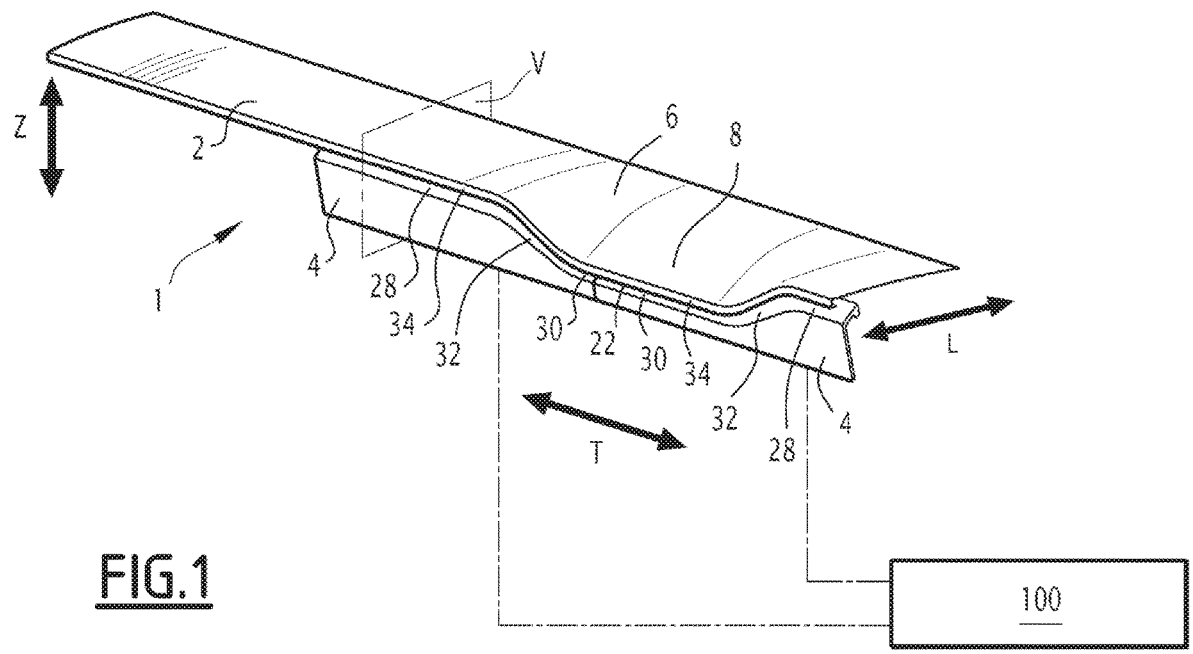
FIG. 1 is a schematic perspective illustration of a trim element according to an embodiment of the invention, the outer surface having a first shape.
Figure 2:
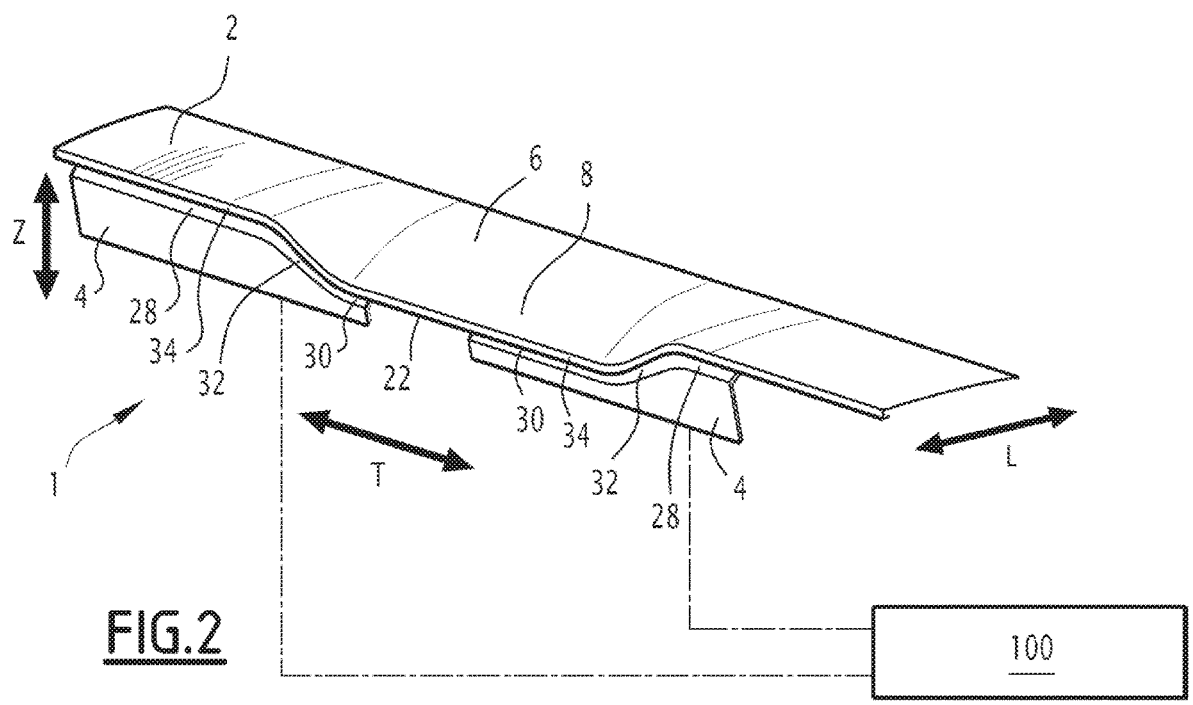
FIG. 2 is a schematic perspective illustration of the trim element of FIG. 1, the outer surface having a second shape.

A trim element 1 of a vehicle according to one embodiment of the invention is shown in FIGS. 1 and 2.

The trim element 1 is for example a dashboard, a door panel, seat trim or the like.

The trim element 1 comprises a structure and a skin.

An elevation direction Z is defined, for example, in the usual direction in a vehicle, i.e., the direction perpendicular to the rolling plane of the vehicle in which the trim element is intended to be installed. The terms "top" and "bottom" are defined in the elevation direction in the usual way.

The longitudinal L and transverse T directions are also defined perpendicular to the elevation direction Z in the usual way in a vehicle. The expressions "front" and "rear", "left" and "right" will be used hereinafter relative to the normal movement direction of the vehicle.

The structure and the skin together define the form of an outer surface 6 of the trim element 1, i.e., the visible surface of the trim element 1, for example from the passenger compartment of the vehicle in which the trim element 1 is installed.

The outer surface 6 is for example able to be deformed in a deformable zone 8. The deformation is for example resilient, i.e., the outer surface regains its initial shape when it is not deformed.

The structure comprises at least one first element 2 and at least one second element 4.

The skin covers at least part of the first element 2 and of the second element 4. In one preferred embodiment, the skin completely covers the first element 2 and the second element 4.

The skin is, for example, made from plastic, leather, faux leather, ligneous material or the like. The skin 14 here has a constant thickness. It is, however, understood that the skin may have a variable thickness.

The skin 14 has a visible face forming the outer surface of the trim element and arranged to impart its appearance and feel to the trim element 1 and an opposite face. The opposite face faces the structure.

The skin 14 is for example flexible.

The trim element 1 here comprises a single first element 2 forming the body of the trim element 1 and extending over the entire trim element 1 and at least one second element 4 moving in contact with the first element 2.

Figure 3:
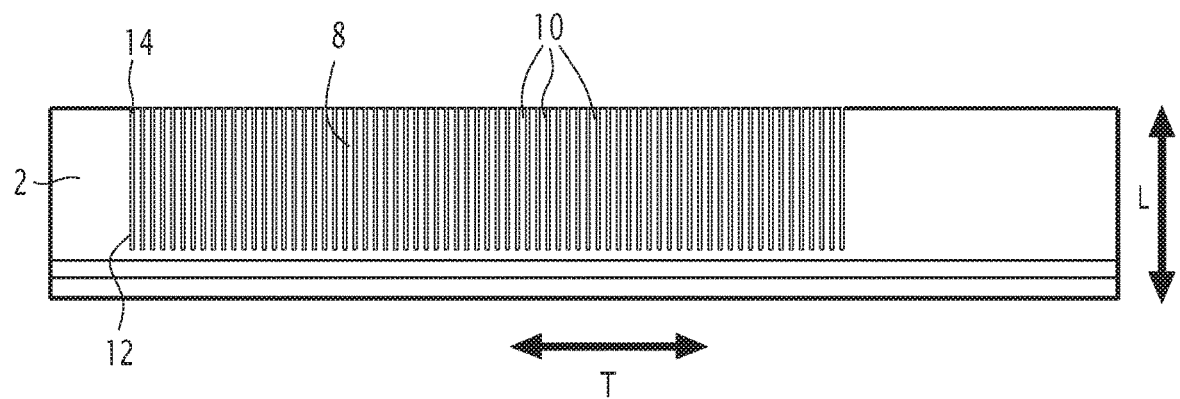
FIG. 3 is a schematic top illustration of one embodiment of the first element of the trim element.
Figure 4:
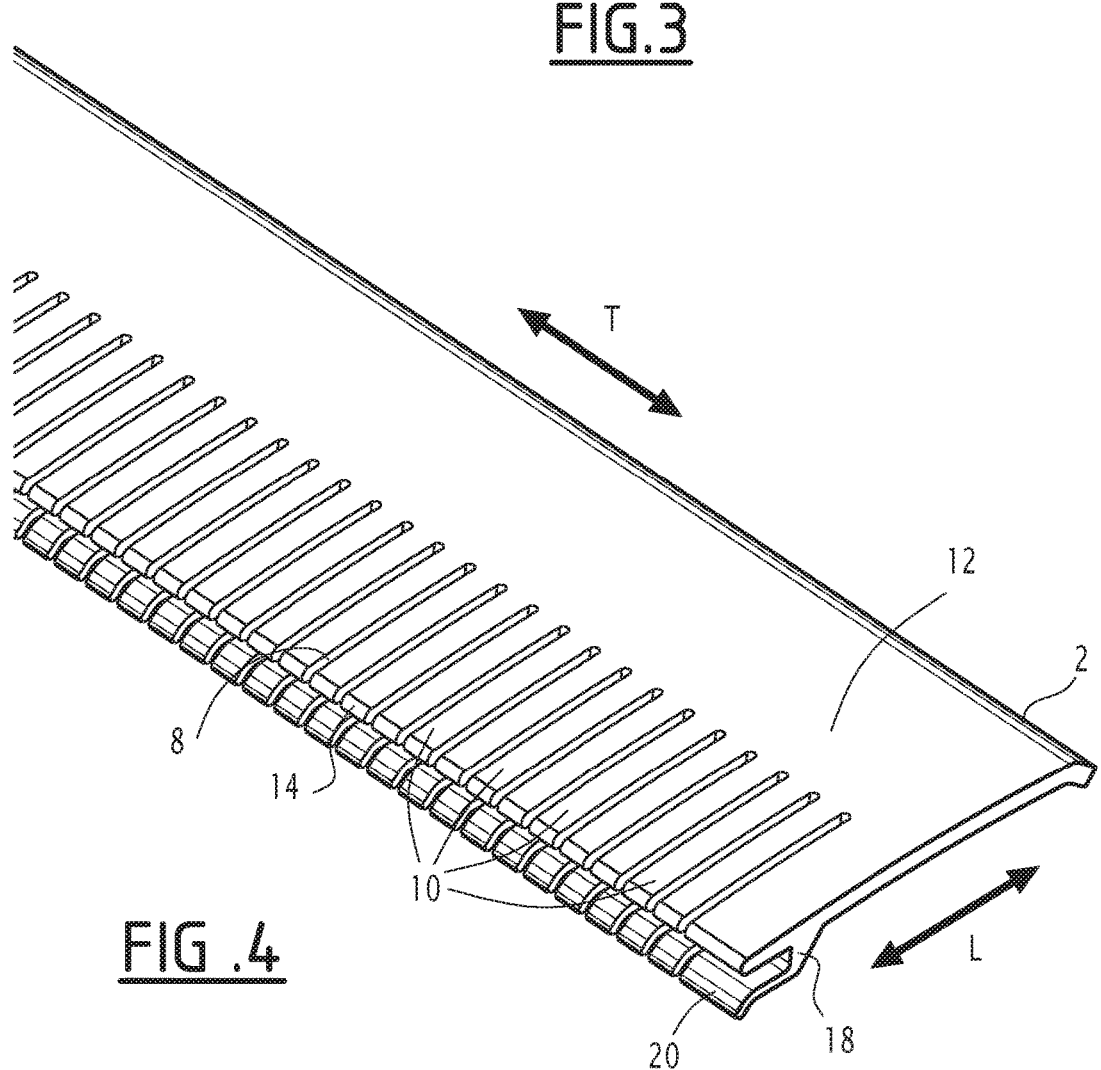
FIG. 4 is a schematic perspective illustration of another embodiment of the first element of the trim element.

According to the embodiments shown in FIGS. 3 and 4, the first element 2 comprises a series of strips 10 each extending in a third direction, here corresponding to the longitudinal direction L. The strips 10 are adjacent to one another in a first direction, here corresponding to the transverse direction T, substantially perpendicular to the first longitudinal direction L, and form a part of the surface of the first element 2 defining the outer surface 6 of the trim element 1 with the skin.

Each strip 10 is, for example, cut in the first element 2 and comprises a first end 12 secured to the rest of the first element 2 and a second end 14 that is free, forming part of a transverse edge of the first element 2.

Each strip 10 is deformable relative to the rest of the first element 2 in a second direction, here corresponding to the elevation direction Z, substantially perpendicular to the transverse T and longitudinal L directions, for example by rotation around a transverse axis passing near the first end 12. Thus, by exerting pressure on the second free end 14, it is possible to move the strip 10 relative to the rest of the first element 2, such that it extends in a different plane from the rest of the surface of the first element 2 when it is deformed. The shape and material of the strips 10 are such that the deformation of the strips 10 is resilient. The strips 10 are for example obtained by cutting of the first element 2 or by molding them in a single piece with the first element 2, which is for example made by injecting a plastic material.

Figure 5:
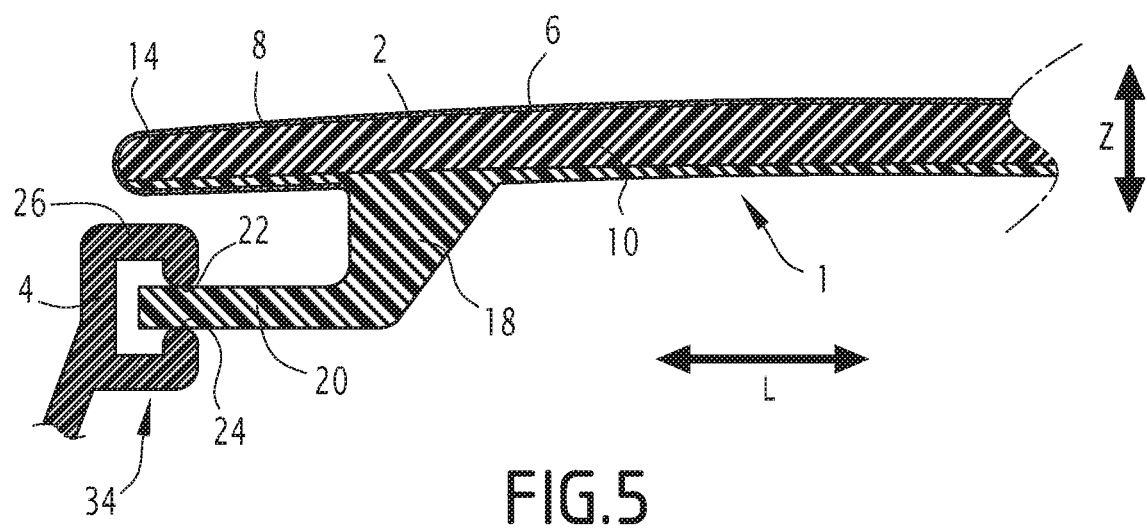
FIG. 5 is a schematic sectional illustration along plane V of FIG. 1, according to one embodiment of the invention.
Figure 6:
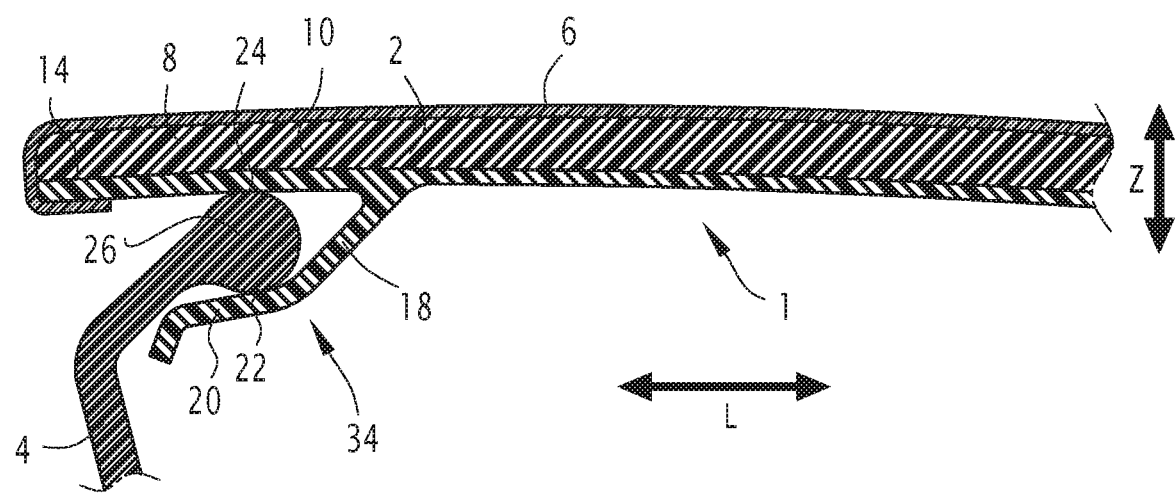
FIG. 6 is a schematic sectional illustration along plane V of FIG. 1, according to another embodiment of the invention, and FIG. 7 schematically depicts the presence of a second trim element with the trim element.
Figure 7:
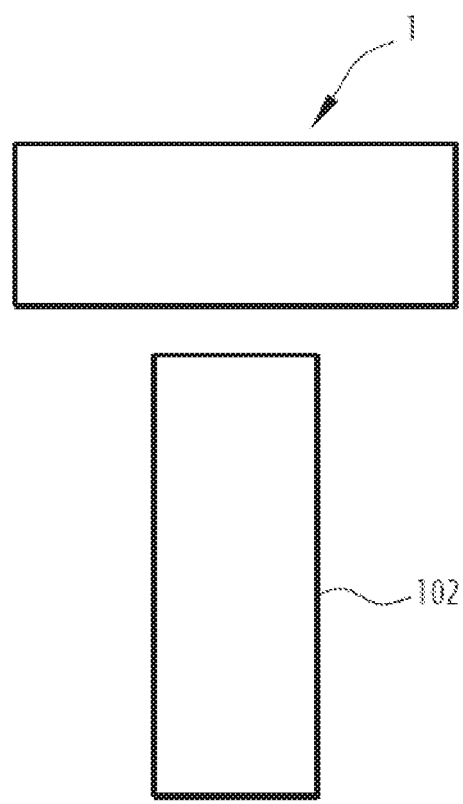

Each strip 10 comprises, near its second free end 14, a protrusion 18 protruding from the face of the strip 10 opposite the face turned toward the outer surface 6 of the trim element 1. The protrusion 18 comprises a tongue 20 extending substantially parallel to the strip 10. The series of tongues 20 in the transverse direction T forms a guide surface 22, the function of which will be described later. According to one embodiment, shown in FIG. 5, the tongues 20 are intended to cooperate with a rail 24, which will be described later. According to the embodiment shown in FIG. 6, the tongues 20 form, with the part of the strip 10 opposite them, a rail 24, as will be described later.

It should be noted that the guide surface 22 could be formed directly by the second free end 14 of the strips 10.

However, providing the guide surface 22 at the end of a tongue 20, as described above, makes it possible to improve the appearance of the trim element by facilitating the concealing of the actuating element 4, as will be described later.

The guide surface 22 extending in the transverse direction T is deformable, since each strip 10 is deformable relative to the rest of the first element 2, as previously described. Such an embodiment makes it possible to make a first element 2 from a substantially rigid material while comprising a resiliently deformable zone.

In all cases, the guide surface 22 is deformable in the elevation direction Z, substantially perpendicular to the longitudinal and transverse directions, as previously described. Thus, by deforming the guide surface 22, it is possible to form hollows and reliefs in the deformable zone 8 on the outer surface 6 of the trim element 1, as shown in FIGS. 1 and 2.

The trim element 1 here comprises two second elements 4.

Each second element 4 is able to deform said strips 10, more particularly by cooperating with the guide surface 22, so as to create the desired shapes in the outer surface 6 of the trim element 1.

Each second actuating element 4 is a substantially rigid part extending across from a portion of the deformable zone 8 of the first element 2.

Each second element 4 comprises an actuating segment 26 arranged to cooperate with the guide surface 22. To that end, according to the embodiment shown in FIG. 5, the actuating segment 26 forms the rail 24, in which the tongues 20 can be inserted and guided. According to the embodiment shown in FIG. 6, the actuating segment 26 is inserted into the rail 24 formed by the tongues 20 and the strips 10. When the guide surface 22 is formed directly by the second free end 14 of the strips 10, the actuating segment 26 forms a rail in which the second free ends 14 of the strips 10 can be inserted and guided.

The actuating segment 26 extends non-rectilinearly in the transverse direction T, i.e., the actuating segment 26 undergoes at least one change of plane in the transverse direction T. This change of plane is done in the deformation direction of the guide surface 20, i.e., in the elevation direction Z in the embodiments described above. Thus, the actuating segment 26 comprises at least a first part 28 extending rectilinearly in the transverse direction T and at least a second part 30 extending rectilinearly in the transverse direction T and offset in the elevation direction Z relative to the first part 28, as shown in FIGS. 1 and 2. Between the first 28 and second 30 parts, the actuating segment 26 for example comprises a third part 32 that is inclined in the transverse direction T and joining the first part 28 to the second part 32.

Each part 28, 30, 32 of the actuating segment 26 is arranged to cooperate with at least one strip 10 forming the guide surface 22. In other words, each part 28, 30, 32 receives at least one tongue 20 or is received in the rail 24 defined by at least one tongue 20. The part of the guide surface 22 thus cooperating with the actuating segment 26 is called actuating zone 34. The actuating zone 34 therefore extends over at least two successive strips 10 in the transverse direction T.

Since the parts of the actuating segment 26 extend in different planes, it is understood that the tongues 20 of the strips 10 cooperating with these parts of the actuating segment are deformed to extend in the same plane as the part with which they cooperate and that the actuating zone 34 is deformed such that it adopts the shape of the actuating segment 26. This causes a deformation of the outer surface 6 of the trim element 1, as shown in FIGS. 1 and 2.

As an example, the first part 28 of the actuating segment extends substantially in the same plane as the tongues 20 when they are not deformed and the second part 30 of the actuating segment is offset relative to the first part so as to create a distance between the plane of the non-deformed tongues 20 and the second part 30. Thus, the actuating zone 34 is deformed such that the outer surface 6 follows the transition between the first and second parts 28, 30 and comprises a nondeformed zone across from the first part 28, a zone inclined along the third part 32 and a rectilinear zone along the transverse direction following the second part 30, which creates a hollow zone in the outer surface 6 of the trim element 1 when the second part 30 extends at a height, measured in the elevation direction Z, below the height of the first part 28, as shown in FIGS. 1 and 2. By providing a second part 30 extending at a height greater than the height of the first part 28, it is understood that the actuating zone 34 creates a protruding zone in the outer surface 6. Due to the deformation of the actuating zone 34, strips 10 adjacent to the strips 10 of the actuating zone 34 are also deformed due to the constraint applied by the actuating segment 26 on the guide surface 22, as more particularly shown in FIG. 2.

In order for the deformation of the actuating zone 34 to be gradual, it is advantageous for several adjacent strips to cooperate with each of the parts 28, 30, 32 of the actuating segment 26.

It is understood that by providing more parts in the actuating segment and by modifying the shape of the segment, it is possible to choose the shape of the desired deformation in the outer surface 6. Thus, it is possible to create deformations such that the outer surface 6 comprises one or several hollow zones and one or several protruding zones.

It will be noted that the deformed zone retains a certain rigidity, since it is bearing on the second elements 4, which are rigid. Thus, the feel and the mechanical strength of the outer surface 6 are substantially the same over the entire surface, including in the deformed zone.

The first element 2 and each second element 4 are able to be moved relative to one another, said movement causing a deformation of the outer surface 6 of the trim element 1.

More particularly, the first element 2 and the second element 4 are able to be moved between a first configuration, visible in FIG. 1, and a second configuration, visible in FIG. 2. The outer surface 6 of the trim element 1 is deformed from a first shape in the first configuration to a second shape in the second configuration.

The first element 2 and at least one, more particularly each, second element 4 are able to be moved relative to one another in the transverse direction T, more particularly such that the actuating segment 26 can move along the guide surface 22 in the transverse direction T. This movement causes a movement of the actuating zone 34 and therefore a gradual change of the strips 10, which cooperate with the parts 28, 30, 32 of the actuating segment 26. It will thus be understood that the deformed zone moves with the movement of the actuating segment 26, as can be seen in FIGS. 1 and 2, between which the second element 4 has been placed. During the movement, some strips 10 stop cooperating with the actuating segment 26 and can return to their initial position if the stresses applied by the actuating segment allow it, while others begin to cooperate with the actuating segment and deform based on the part of the actuating segment 26 with which they cooperate. Thus, the movement of the deformation is done continuously and aesthetically, while giving an impression of a wave that moves over the outer surface 6 of the trim element.

Between the actuating zones 34, the deformed zone of the outer surface 6 has a basin shape whereof the bottom extends in the actuating zones 34 and having inclined walls opposite the third parts 32 of the actuating segments and an inclined wall along the longitudinal direction L toward the actuating zones 34.

In the first configuration, the two second elements 4 are adjacent to one another.

In the second configuration, the two second elements 4 are separated from one another.

Alternatively or additionally, by moving one or both second elements 4, it is possible to move the basin in the transverse direction T between the first position and the second position.

In the first configuration, the two second elements 4 are for example such that the basin is across from a driver in the longitudinal direction L.

In the second configuration, the two second elements 4 are for example such that the basin is substantially at the center of the trim element 1 in the transverse direction T.

The trim element 1 further comprises a control system 100 suitable for driving the movement of the second element 4 relative to the first element 2. The movement is for example controlled by the control electronics of the vehicle.

Thus, the trim element 1 offers great configurability in the appearance that can be imparted to the outer surface, while retaining uniform rigidity and feel properties over the entire outer surface.

The embodiment shown in FIGS. 1 and 2 is particularly advantageously when it is used with a trim element forming a vehicle dashboard. The hollow deformation can indeed be placed across from a display device of the vehicle, such as a screen. In a position where the basin has a reduced size, in the first configuration, the latter can be placed across from the conductor in order to create a limited visibility zone on the screen, such that the driver focuses on information relative to driving the vehicle displayed on a zone of the screen across from the basin. By enlarging the basin and moving it substantially to the center of the trim element in the transverse direction, in the second position, it is possible to enlarge the visibility zone in order to allow the passengers to see a larger part of the screen, for example when the vehicle is in an autonomous driving configuration, in which the driver does not participate in the driving of the vehicle.

It is, however, understood that the invention can be used in other contexts, for example to move a zone protruding from the outer surface in order to form a support surface for a limb of a passenger of the motor vehicle to the desired location based on the position of the passenger's seat and/or the morphology of the passenger. Such a support surface is for example an armrest or a footrest or the like.

In another embodiment that is not shown, the second element is formed by a rigid element arranged between the first element and the skin.

The second element is movable between the first element and the skin and deforms the skin in the location where it is arranged. More particularly, the skin conforms to the shape of the second element where the second element extends and conforms to the shape of the first element elsewhere. Thus, the movement of the second element causes a deformation of the outer surface of the trim element.

In another embodiment that is not shown, each strip is actuated by an actuator able to move each strip along the second direction.

The invention further relates to a vehicle comprising a first trim element according to one embodiment of the invention.

The vehicle further comprises a second trim element 102.

The second trim element is for example an armrest, an element of the floor of the vehicle and/or a seat.

The second trim element has a deformable outer surface, such that the outer surface of the second trim element deforms in a manner coordinated with the deformation of the outer surface of the first trim element.

The second trim element is for example at least one front seat. According to one example, when the first element and the second element are in the first configuration, the front seat is such that a person seated thereupon faces the road. When the first element and the second element are in the second configuration, the front seat is such that a person seated thereupon faces the basin, more particularly oriented toward the center of the trim element in the transverse direction T. This for example makes it possible to orient the field of view of the occupant of the seat toward a particular point of interest of the passenger compartment, such as the road when the occupant of the seat is driving and the center of the trim element where a display system may be provided, when the occupant is not driving.

Additionally or alternatively, the second trim element is a central armrest located between a right front seat and a left front seat. When the first element and the second element are in the first configuration, the armrest is in a retracted position. In the retracted position, the armrest for example assumes the form of a slab elongated in the longitudinal direction L. When the first element and the second element are in the second configuration, the armrest is in an extended position. In the extended position, lateral parts of the armrest deploy in order to increase the upper bearing surface relative to this surface in the retracted position. The lateral parts are for example arranged on either side of the slab form in the transverse direction T.

The vehicle is thus able to adapt its arrangement generally to different configurations.

The invention claimed is:

1. A dashboard of a vehicle, comprising:
   a structure comprising at least one first element and at least one second element,
   a skin covering at least part of the first element and of the second element,
   wherein the structure and the skin together defining an outer surface of the dashboard,
   the first element and the second element being able to be moved relative to one another, said movement causing a deformation of the outer surface of the dashboard.

2. The dashboard according to claim 1, comprising a control system suitable for driving the movement of the first element and the second element relative to one another.

3. The dashboard according to claim 1, wherein the first element and the second element are able to be moved between a first configuration and a second configuration, the shape of the outer surface of the dashboard being deformed from a first shape in the first configuration to a second shape in the second configuration.

4. The dashboard according to claim 3, comprising two second elements, the two second elements being adjacent to one another in the first configuration and being separated from one another in the second configuration.

5. The dashboard according to claim 1, comprising a single first element forming the body of the dashboard and extending over the entire dashboard and at least one second element moving in contact with the body.

6. The dashboard according to claim 5, wherein the body comprises a series of strips adjacent to one another in the first direction, each strip being deformable relative to the rest of the body in a second direction substantially perpendicular to the first direction, the second element being suitable for deforming said strips.

7. The dashboard according to claim 6, wherein the first element and the second element are able to be moved relative to one another in the first direction.

8. A vehicle comprising a dashboard according to claim 1.

9. The vehicle according to claim 8, comprising a second trim element, the second trim element having a deformable outer surface, such that the outer surface of the second trim element deforms in a manner coordinated with the deformation of the outer surface of the dashboard.

* * * * *